United States Patent [19]

Nagaoka et al.

[11] Patent Number: 4,913,546
[45] Date of Patent: Apr. 3, 1990

[54] RANGE FINDER

[75] Inventors: Shinji Nagaoka; Koji Sato; Yuji Nakajima, all of Yotsukaido, Japan

[73] Assignee: Seikosha Co., Ltd., Japan

[21] Appl. No.: 696,047

[22] Filed: Jan. 29, 1985

[30] Foreign Application Priority Data

Jan. 30, 1984 [JP] Japan .................. 59-14824

[51] Int. Cl.$^4$ .................. G03B 3/00; G01C 3/00
[52] U.S. Cl. .................. 356/1; 354/403
[58] Field of Search .................. 356/1; 354/403

[56] References Cited

U.S. PATENT DOCUMENTS

| | | | |
|---|---|---|---|
| 3,751,154 | 8/1973 | Frazee et al. | 354/403 |
| 3,820,129 | 6/1974 | Hosoe et al. | 354/403 |
| 4,497,560 | 2/1985 | Nagaoka et al. | 354/403 |
| 4,529,304 | 7/1985 | Ogawa et al. | 354/403 |
| 4,579,450 | 4/1986 | Nagaoka et al. | 354/403 |

Primary Examiner—Russell E. Adams
Attorney, Agent, or Firm—Bruce L. Adams; Van C. Wilks

[57] ABSTRACT

A range finder for use with a still camera and the like, projects an infrared light beam to an object and the light beam reflected from the object is detected by a split photosensor. The photosensor is made up of two photodiodes connected in opposite polarity relationship so that a differential photocurrent produced by the diode pair is amplified. The reflected light beam is tracked so that the photosensor provides a zero output, and the distance to the object is determined from the time needed to detect the zero photosensor output.

11 Claims, 3 Drawing Sheets

RANGE FINDER

BACKGROUND OF THE INVENTION

The present invention relates to a range finder and, particularly, to a range finder of so-called active type based on triangulation for distance measurement and adapted for use with a compact equipment such as a still camera.

Most of modern cameras with lens shutter are equiped with an automatic focusing device of so-called active type which measures the distance to the object by emitting an infrared light beam to the object and detecting a reflected light beam. Among such devices there is proposed a range finder in which a light beam reflected from the object is focused by a reception lens, the focal plane is scanned by a moving split photosensor to detect the image of the reflection light beam, and the distance to the object is determined from the position of the image. This system operates to detect the image position in response to equal outputs of two splitted sensors, allowing a constant measuring accuracy for a wide range of reflectivity of objects. Moreover, in case the device is applied to a camera, a signal indicating whether the object image is front or back of the focal plane can readily be produced by using the two sensors, that cannot be achieved by other system using a single sensor for range finding.

On the other hand, however, the split sensor system needs dual complex amplifying circuits of several stages before comparing two faint sensor outputs, i.e., double in number as compared with a single sensor system. Light pulses are used for the measurement for the purpose of distinction from extraneous light sources, and the number of discrete components such as capacitors needed for the process of a.c. signals is also increased. In addition, the nonlinear amplifier for a wide coverage of input intensity, band-pass filter and synchronous detector are all needed in dual for two sensors.

There is a proposal of reducing the number of circuit components by provision of a multiplexer so that two sensor outputs are processed by one set of circuits on a time-sharing basis. However, the multiplexer creates noises which exacerbate an even worse S/N ratio due to extremely faint reflection light beam from the object as mentioned above, resulting in a degraded performance of range finding, particularly, in measuring a distant object.

SUMMARY OF THE INVENTION

The present invention contemplates to arrange a range finder using relatively simple amplifying circuit stages comparable in the scale with the arrangement of the single sensor system, while using a split sensor and retaining the advantages of the dual sensor system.

A prime feature of the present invention is the provision of untiparallel or counter-serial connected split sensor diodes at the input of the amplifier so that only the difference between the two sensor outputs is amplified. Accordingly, the equality of two sensor outputs which is the most critical phase of process can be detected by sensing the zero output of the amplifier. This differential scheme, at the same time, prevents the saturation of input circuit when the incident light is very strong and also cancels optical noises, whereby a range finder with an improved S/N ratio and measurement accuracy can be realized.

BRIEF DESCRIPTION OF THE DRAWINGS

FIG. 5 is a diagram showing the structure of the split sensor used in the arrangement of FIG. 4a.

DETAILED DESCRIPTION OF THE INVENTION

An embodiment of the present invention will now be described with reference to the drawings.

Figure 1:
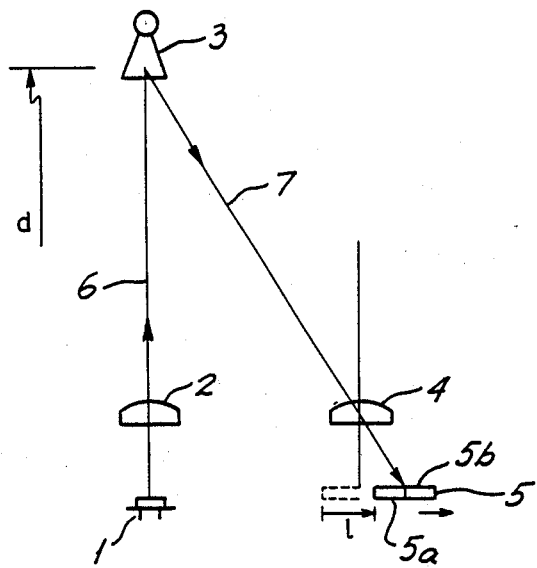
FIG. 1 is an illustration showing the principle of the range finder according to the present invention.

The measurement system of FIG. 1, to which this invention is applied, includes a light emission means or radiation projection means 1 such as an infrared light emitting diode, a projection lens 2, an object 3 whose distance is to be measured, a reception lens 4, and a split photosensor 5 made up of two photosensitive elements 5a and 5b such as silicon photodiodes. Reference number 6 denotes the optical axis of the projected radiation beam, and 7 denotes the optical axis of the reflected radiation beam. The split photosensor 5, which is initially located at the position shown by the dashed profile, is along a line extending transversely of the axis of the projected radiation beam with a scanning distance of 1 at which the photosensitive elements 5a and 5b receive the same amount of reflection light. The distance to the object 3 is determined from the value 1. Alternatively, instead of moving the split photosensor 5, the reception lens 4 may be moved, or a mirror may be used to deflect the optical axis of reflection so that the distance is determined from the angle or displacement of the mirror. The foregoing is merely an example of various optical system arrangements for the range finder including those which the inventor of this invention has already offered.

Figure 2:
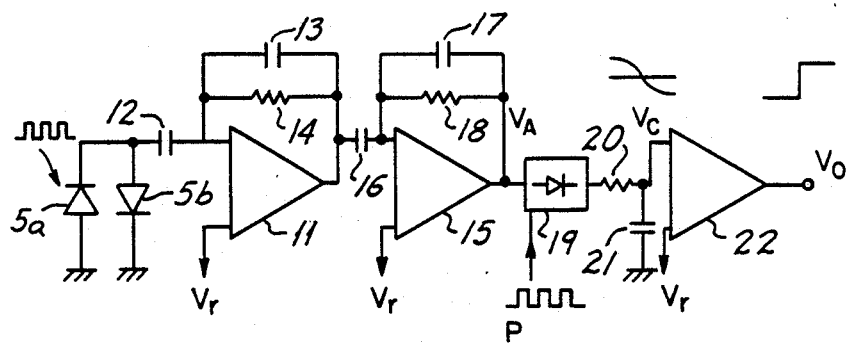
FIG. 2 is a schematic diagram showing the signal processing circuit embodying the present invention.
Figure 3:
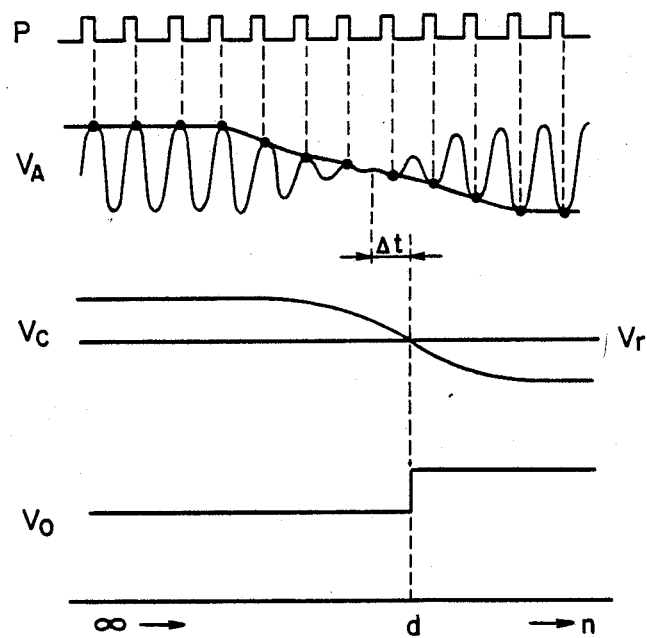
FIG. 3 is a set of waveform diagrams used to explain the operation of the arrangement shown in FIG. 2.

Next, an example of circuit arrangement for the range finder, to which the present invention is applied, will be described with reference to FIG. 2 and also FIG. 3 showing the signal waveforms.

The arrangement of FIG. 2 includes a pair of photosensitive elements 5a and 5b such as photodiodes one electrode of the photosensitive element, 5a being in a grounded-anode connection and one electrode of the photosensitive element being 5b in a grounded-cathode connection, with their remaining electrodes being connected together. The photosensitive elements 5a and 5b are disposed closely on a plane to constitute a split photosensor as mentioned above and shown in FIG. 1. Reference numbers 11 and 15 denote a.c. amplifiers having associated input capacitors 12 and 16, feedback resistor-capacitor pairs 14, 13 and 18, 17, respectively. In order to distinguish the optical signal from extraneous light emissions,the light emitting element is driven or modulated by a pulse current and only the signal component is amplified by the a.c. amplifiers 11 and 15. The arrangement further includes a synchronous detection circuit 19 which demodulates the amplified signal in synchronism with the light source drive pulse current, a resistor-capacitor pair 20, 21 forming an integration circuit, and a voltage comparator 22 with its one input receiving the output of the integrator and another input receiving reference voltage Vr which is also supplied to the reference input of the a.c. amplifiers 11 and 15.

Next, the operation of the above arrangement will be described.

A pulse-modulated optical signal reflected by the object and mixed with extraneous lights is received by the photosensitive elements 5a and 5b. When the split photosensor 5 is located at one extreme position corresponding to the infinite distance, the element 5b receives a greater amount of light and produces a larger output current than the element 5a, resulting in a positive pulse signal entering through the capacitor 12 to the input of the first-stage amplifier 11. Because of the a.c. amplifiers 11 and 15, the input signal is differentiated to have peaks in both polarities, and in order to demodulate the input positive pulse signal, the amplified output is subjected to synchronous detection so that only a signal component responsive to the light signal emission is separated on a phase treatment basis.

The amplified positive pulse signal is reduced to a d.c. signal by the integration circuits 20, 21 of the next stage. The integrated output voltage, as shown by Vc in FIG. 3, has a delay of $\Delta t$ with respect to the detection output shown by $V_A$. The time axis of FIG. 3 corresponds to the scanning or moving operation of the sensor 5 in the direction from infinite distance ($\infty$) to a short distance (n). As the sensor 5 scanning undergoes movement, the reflection light beam moves progressively and relatively from element 5b to element 5a. The element 5a comes to produce a larger output current than that of the element 5b, resulting in a negative pulse entering to the amplifier 11, and consequently the integrated output falls across the reference voltage level Vr. At a time point during this process when the integrated output coincides with the reference voltage Vr, the two photosensitive elements 5a and 5b provide equal outputs, which cancel each other, causing the amplifier 11 to receive a zero input. This time point gives the position of the photosensor 5 for measuring the distance to the object. The event is detected by the voltage comparator 22, which makes a transition of output states from low to high as shown by Vo in FIG. 3. The scanning distance shown by d in the figure corresponds to the distance from the measuring device to the object. FIG. 3 further includes the waveform of the pulse signal or click pulses P for driving or modulating the light emitting element, and the output $V_A$, of the a.c. amplifier 15 with points on the waveform linked by the solid line indicates the demodulation level in the synchronous detection.

Figure 4:
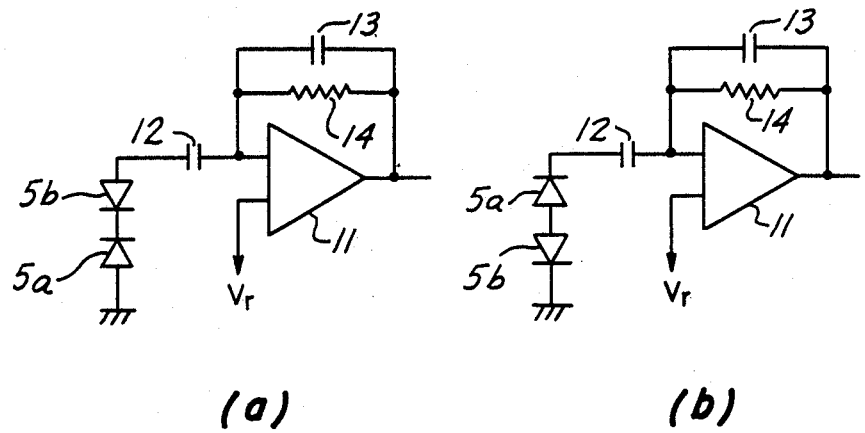
FIGS. 4a and 4b are schematic diagrams of the front end section of the circuit arrangement, showing different connections of the photosensitive elements.

FIG. 4 shows modified arrangments of the photosensitive elements 5a and 5b, case (a) being a common cathode connection, case (b) being a common anode connection. In both cases, the difference or differential output signal of the photocurrents produced by the two elements is fed to the amplifier, and the operation of the whole circuit is exactly the same as in the foregoing embodiment. In order to make the gap of two photosensitive elements of a split photosensor as small as possible, two photodiodes are preferably formed on a common semiconductor substrate, and the embodiments of FIG. 4 are advantageous from this view point.

Figure 5:
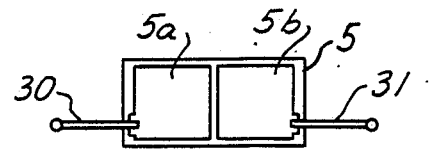
Figure 5:
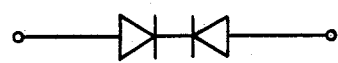

FIG. 5 shows, as an example, the structure of the split photosensor which is illustrated symbolically at the bottom of the figure. On the substrate of a common cathode region, anode regions for the photodiodes 5a and 5b are formed separately with respective anode terminals 30 and 31 attached thereon.

Figure 6:
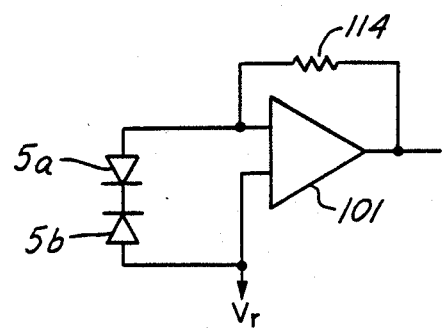
FIG. 6 is a schematic diagram of the modified input circuit using a d.c. amplifier.

FIG. 6 shows another embodiment of the input circuit adapted to the light emitting element driven by a direct current, instead of the pulsed current. The input circuit consists of a d.c. amplifier 101 having a feedback resistor 114. the arrangement does not use a.c. amplifiers, and thus no synchronous detector is needed. Accordingly, the signals P and $V_A$ in FIG. 3 do not exist, and the d.c. amplifier directly provides the signal waveform shown by Vc. The following stage of the arrangement is the same as the previous embodiment.

As described above, the inventive range finder is not influenced by the reflectivity of the object, and is not disturbed by intense extraneous light emissions, while operating in less complex circuit arrangement with an improved S/N ratio. The simple circuit arrangement makes the device suitable for being built in a compact equipment such as a still camera, and is significantly effective for the cost reduction of the equipment.

What is claimed is:

1. A range finder for measuring the distance of an object according to a position at which a reflected radiation beam is received, the range finder comprising: projection means for projecting a radiation beam towards an object whose distance is to be measured; receiving means movable along a line extending transversely of the axis of the projected radiation beam for receiving the radiation beam reflected by the object, the receiving means including a pair of photosensitive elements disposed adjacent to each other along the aforesaid line and each being operative to produce an electric signal proportional to the amount of radiation received thereby, and means electrically connecting the pair of photosensitive elements so that the electric signals produced thereby tend to cancel each other to thereby produce a differential output signal representative of the difference between the amounts of radiations received by the pair of photosensitive elements; and detection means for detecting when the differential output signal becomes zero during the movement of the receiving means to thereby determine the position at which the reflected radiation beam is received by the receiving means.

2. A range finder according to claim 1; wherein the projection means comprises a light emitting diode.

3. A range finder according to claim 2; wherein the light emitting diode comprises a light emitting diode for projecting an infrared radiation beam.

4. A range finder according to claim 1; including modulation means for producing clock pulses to modulate the projected radiation beam.

5. A range finder according to claim 1; wherein the pair of photosensitive elements comprise a pair of photodiodes.

6. A range finder according to claim 5; wherein the pair of photodiodes are connected in parallel in opposite polarity relationship to each other.

7. A range finder according to claim 5; wherein the pair of photodiodes are connected in series at the common cathodes thereof.

8. A range finder according to claim 5; wherein the pair of photodiodes are connected in series at the common anodes thereof.

9. A range finder according to claim 4; wherein the detection means comprises an a.c. amplifier responsive to the differential output signal for amplifying the same, and a synchronous detector circuit for detecting the output of the a.c. amplifier in synchronism with the clock pulses produced by the modulation means.

10. A range finder according to claim 9; wherein the detection means further comprises an integration circuit for integrating the output of the synchronous detector circuit, and a voltage comparator responsive to the output of the integration circuit for comparing the same with a reference voltage to detect when the differential output signal becomes zero.

11. A range finder according to claim 1; wherein the detection means includes means for determining the position at which the reflected radiation beam is received by the receiving means in terms of the time interval from the initiation of movement of the receiving means to the detection of a zero differential output signal.

* * * * *